US009540281B2

(12) United States Patent
Warner et al.

(10) Patent No.: US 9,540,281 B2
(45) Date of Patent: Jan. 10, 2017

(54) PROGRESSIVE BUBBLE GENERATING SYSTEM USED IN MAKING CEMENTITIOUS FOAM

(71) Applicant: Air Krete, Inc., Weedsport, NY (US)

(72) Inventors: Terry P. Warner, Port Byron, NY (US); R. Keene Christopher, Weedsport, NY (US)

(73) Assignee: AIR KRETE, INC., Weedsport, NY (US)

(*) Notice: Subject to any disclaimer, the term of this patent is extended or adjusted under 35 U.S.C. 154(b) by 0 days.

(21) Appl. No.: 14/535,673

(22) Filed: Nov. 7, 2014

(65) Prior Publication Data

US 2015/0122153 A1 May 7, 2015

Related U.S. Application Data

(60) Provisional application No. 61/901,205, filed on Nov. 7, 2013.

(51) Int. Cl.
*B28C 5/06* (2006.01)
*C04B 14/36* (2006.01)
(Continued)

(52) U.S. Cl.
CPC ......... *C04B 14/365* (2013.01); *B01F 3/04446* (2013.01); *B01F 5/0473* (2013.01); *B01F 5/0694* (2013.01); *B01F 5/0696* (2013.01); *B28C 5/026* (2013.01); *B28C 5/06* (2013.01); *C04B 14/04* (2013.01); *C04B 14/042* (2013.01); *C04B 14/043* (2013.01); *C04B 14/047* (2013.01); *C04B 14/106* (2013.01); *C04B 14/24* (2013.01);
(Continued)

(58) Field of Classification Search
CPC .......... B28C 5/026; B28C 5/06; B01F 5/0473; B01F 5/0694; B01F 5/0696; Y02W 30/94
USPC ........................ 366/10, 11, 13, 16, 51, 152.1, 366/160.1–160.5; 169/13–15; 261/94, 261/DIG. 26
See application file for complete search history.

(56) References Cited

U.S. PATENT DOCUMENTS

| 1,941,726 A | * | 1/1934 | Vawter | ..................... E04F 21/12 239/428.5 |
| 1,953,091 A | * | 4/1934 | Wesberg | ............... B28C 5/1261 366/11 |

(Continued)

FOREIGN PATENT DOCUMENTS

| DE | 3429010 A1 | * | 1/1986 | ............. E21D 11/10 |
| EP | 1103533 A2 | * | 5/2001 | ............ B01F 5/0473 |

(Continued)

OTHER PUBLICATIONS

PCT Search Report dated Feb. 24, 2015.

*Primary Examiner* — Charles Cooley
(74) *Attorney, Agent, or Firm* — Bond Schoeneck & King, PLLC; George McGuire

(57) ABSTRACT

A process for producing insulating foam, wherein certain especially small inorganic minerals such as silica fume are directly integrated into bubble fluid to better mechanically strengthen bubbles formed and thus allow the formation of smaller bubbles to be reformed. The manner of reforming the bubbles is progressive and actualized by a glass bead chamber, a second stage consisting of two screened discs, separated from each other and located at the end of the glass bead chamber, and a third stage chamber presenting itself with a considerably enlarged screen area and having considerably finer meshes than the second stage.

26 Claims, 5 Drawing Sheets

(51) Int. Cl.
*B01F 3/04* (2006.01)
*C04B 14/04* (2006.01)
*C04B 14/30* (2006.01)
*C04B 14/10* (2006.01)
*C04B 14/24* (2006.01)
*C04B 28/32* (2006.01)
*C04B 38/10* (2006.01)
*B01F 5/04* (2006.01)
*B01F 5/06* (2006.01)
*B28C 5/02* (2006.01)

(52) U.S. Cl.
CPC ............. *C04B 14/304* (2013.01); *C04B 28/32* (2013.01); *C04B 38/10* (2013.01); *Y02W 30/94* (2015.05)

(56) References Cited

U.S. PATENT DOCUMENTS

| | | | | |
|---|---|---|---|---|
| 1,954,005 A * | 4/1934 | Westberg et al. | | 366/11 |
| 2,263,498 A * | 11/1941 | Howard | | E04F 21/12 118/300 |
| 2,392,408 A * | 1/1946 | Radonich | | B28C 5/026 239/1 |
| 2,516,684 A * | 7/1950 | Doull | | B28C 5/026 366/10 |
| 2,534,116 A * | 12/1950 | Fjeldstad | | E04F 21/12 239/289 |
| 2,543,517 A * | 2/1951 | Anderson | | B28C 5/026 239/327 |
| 2,558,229 A * | 6/1951 | Anderson | | B05B 7/149 239/591 |
| 2,565,696 A * | 8/1951 | Moller | | E04F 21/12 239/335 |
| 2,577,664 A * | 12/1951 | Pro | | B28C 5/026 239/431 |
| 2,785,014 A * | 3/1957 | Pro | | B28C 5/026 137/114 |
| 3,522,069 A * | 7/1970 | Checko | | B28C 5/388 106/676 |
| 3,682,446 A * | 8/1972 | Eron | | B01F 3/04446 366/266 |
| 3,811,660 A * | 5/1974 | Cole, Jr. | | E21F 5/00 169/15 |
| 3,871,583 A * | 3/1975 | Kellert | | B28C 5/026 239/302 |
| 3,957,209 A * | 5/1976 | Thomson | | B01F 5/205 239/429 |
| 4,106,111 A * | 8/1978 | Rose | | B01F 3/068 366/10 |
| 4,213,936 A * | 7/1980 | Lodrick | | B29B 7/7438 239/416.1 |
| 4,225,086 A * | 9/1980 | Sandell | | B05B 5/032 239/428 |
| 4,239,397 A * | 12/1980 | Sandell | | B28C 5/026 239/427 |
| 4,298,288 A * | 11/1981 | Weisbrod | | B28C 9/0454 366/11 |
| 4,310,996 A * | 1/1982 | Mulvey | | E04B 7/225 106/676 |
| 4,394,289 A * | 7/1983 | Brown | | A62C 31/12 261/DIG. 26 |
| 4,411,389 A * | 10/1983 | Harrison | | B05B 7/149 222/145.1 |
| 4,644,014 A * | 2/1987 | Thomson | | B29B 7/7438 118/24 |
| 4,731,389 A * | 3/1988 | Christopher | | B29B 7/7438 264/42 |
| 4,815,860 A * | 3/1989 | Deuse | | B28C 7/062 366/10 |
| 4,922,463 A * | 5/1990 | Del Zotto | | B28C 9/0463 222/189.06 |
| 4,932,786 A * | 6/1990 | Hihara | | B01F 3/04446 261/DIG. 26 |
| 4,978,073 A * | 12/1990 | von Eckardstein | | B28C 5/026 239/419.3 |
| 5,044,819 A * | 9/1991 | Kilheffer | | E01C 19/46 177/119 |
| 5,102,228 A * | 4/1992 | Vine-Lott | | B01F 3/04992 137/599.04 |
| 5,113,945 A * | 5/1992 | Cable | | A62C 5/02 169/14 |
| 5,141,363 A * | 8/1992 | Stephens | | B28C 5/386 366/10 |
| 5,145,014 A * | 9/1992 | Eberhardt | | A62C 5/02 169/13 |
| 5,232,052 A * | 8/1993 | Arvidson | | A62C 5/02 169/14 |
| 5,255,747 A * | 10/1993 | Teske | | A62C 5/02 169/15 |
| 5,411,100 A * | 5/1995 | Laskaris | | A62C 5/02 169/14 |
| 5,419,632 A * | 5/1995 | Stephens | | E21D 11/105 366/10 |
| 5,494,112 A * | 2/1996 | Arvidson | | A62C 5/02 137/101.21 |
| RE35,362 E * | 10/1996 | Arvidson | | A62C 5/02 169/13 |
| 5,570,953 A * | 11/1996 | DeWall | | B28C 5/0831 366/10 |
| 5,582,776 A * | 12/1996 | Crawley | | A62C 5/02 169/15 |
| 5,590,976 A * | 1/1997 | Kilheffer | | E01C 19/46 177/119 |
| 5,795,060 A * | 8/1998 | Stephens | | B01F 3/12 366/10 |
| 5,803,596 A * | 9/1998 | Stephens | | A62C 5/02 169/15 |
| RE36,196 E * | 4/1999 | Eberhardt | | A62C 5/02 169/13 |
| 6,009,953 A * | 1/2000 | Laskaris | | A62C 5/02 169/13 |
| 6,046,255 A * | 4/2000 | Gray | | B01F 3/04049 261/DIG. 26 |
| 6,354,726 B2 * | 3/2002 | Foerster | | B28C 5/123 366/13 |
| 6,733,004 B2 * | 5/2004 | Crawley | | A62C 5/02 169/14 |
| 6,766,863 B2 * | 7/2004 | Arvidson | | A62C 5/02 169/13 |
| 6,991,041 B2 * | 1/2006 | Laskaris | | A62C 5/02 169/13 |
| 7,114,503 B2 | 10/2006 | Vialle | | |
| 7,614,455 B2 * | 11/2009 | Arvidson | | A62C 5/02 169/13 |
| 2004/0055762 A1* | 3/2004 | Arvidson | | A62C 5/02 169/14 |
| 2004/0177975 A1* | 9/2004 | Laskaris | | A62C 5/02 169/13 |
| 2005/0155776 A1* | 7/2005 | Arvidson | | A62C 5/02 169/14 |
| 2005/0195681 A1* | 9/2005 | Gembala | | B28C 7/16 366/46 |
| 2006/0293401 A1* | 12/2006 | Porter | | B01F 5/045 521/172 |
| 2010/0127476 A1* | 5/2010 | Gembala | | B01F 3/04446 280/400 |
| 2010/0246312 A1* | 9/2010 | Welker | | B01F 3/04439 366/4 |

(56) References Cited

U.S. PATENT DOCUMENTS

| | | | |
|---|---|---|---|
| 2012/0322902 A1 | 12/2012 | Berke | |
| 2015/0122153 A1* | 5/2015 | Warner | C04B 28/32 |
| | | | 106/675 |
| 2015/0273409 A1* | 10/2015 | Nicolson | B05B 7/0433 |
| | | | 366/5 |

FOREIGN PATENT DOCUMENTS

| | | | | |
|---|---|---|---|---|
| FR | 2684326 A1 * | 6/1993 | | B05B 7/26 |
| FR | 2943381 A1 * | 9/2010 | | B01F 3/04049 |
| GB | 2195909 A * | 4/1988 | | B28C 7/024 |
| GB | 2202163 A * | 9/1988 | | B28C 5/123 |
| KR | 100963907 | 10/2006 | | |
| WO | WO 8202358 A1 * | 7/1982 | | B01F 13/10 |
| WO | WO 9011877 A1 * | 10/1990 | | B28C 5/026 |
| WO | WO 9513173 A1 * | 5/1995 | | B01F 5/0614 |
| WO | WO 2004091878 A2 * | 10/2004 | | B28C 5/388 |
| WO | WO 2005079963 A2 * | 9/2005 | | B01F 3/04539 |
| WO | WO 2008130310 A1 * | 10/2008 | | B05B 7/1495 |

* cited by examiner

PROGRESSIVE BUBBLE GENERATING SYSTEM USED IN MAKING CEMENTITIOUS FOAM

CROSS-REFERENCE TO RELATED APPLICATIONS

The present application relates and claims priority to U.S. Provisional Patent Application, Ser. No. 61/901,205, filed Nov. 7, 2013, the entirety of which is hereby incorporated by reference.

BACKGROUND OF THE INVENTION

The present invention relates to cementitious foams, useful for insulating cavities and structures, exampled by the spaces between walls, floor and ceiling, loft and roof, foundation materials and wall, including insulating hollow core building blocks. This foam insulating product in its cured state is composed of inorganic materials in its majority and thus is rated fire proof. The flame spread is zero and the smoke density factor is zero as rated per ASTM E-84-81a and ASTM E814/UL1479. It does not give off harmful chemical fumes certified by ASTM D5116. Now these values are concurrent from the original cementitious foam of the 1980's as formulated by Air Krete Inc. What has necessarily been sought is the highest insulating value possible. This previous cementitious foam was able to register R-3.9 for its best tested results. Many organic based foams such as both open and closed cell polyurethane, phenolic, polyisocyanurate and icynene typically test higher or similarly to this compared R-value. Organic orchestration of the bubble formation may be mechanically induced, but effectively decided by the chemical responses in the foams. This has been a particular advantage over cementitious foams. A process was developed by trial and error of mechanical manipulation and in combination with inorganic materials having special mechanical attributes as to size and shape, whereby a unique bubble matrix was formed that when combined with introduced cement components, resulted in the invented foam having a substantially higher R-value.

BRIEF SUMMARY OF THE INVENTION

A progressive bubble generating system where the first formation of bubble is induced by means of a proven previously used method. Air and a fluid component, composed typically but not limited to, a calcium-chloride salt, expanding agent, and water, both under pressure, are forcefully directed through a matrix of glass beads having consistent diameters and packed tightly together in a defined cylindrical length and diameter. This fluid component having a working viscosity arrived at through trial and error is slowed in its overall linear movement throughout this glass bead matrix and spreads out in a uniform manner. Whereby, compressed air of a lesser viscosity will move at a relatively faster velocity throughout the matrix of glass beads and the fluid component. This compressed air expands in its forward migration throughout the glass bead matrix and within the fluid component. These resulting expansion and velocity rates were originally developed through trial and error methods in Germany during the 1930's for UFFI, urea formaldehyde foam. In the 1980's, Donald W. Thomson and R. Keene Christopher, represented the development in U.S. Pat. Nos. 4,644,014 and 4,731,389 assigned to Air Krete Inc., of the parameters necessary by trial and error for an entirely different material, a magnesium-oxychloride cement foam. An important element in an efficient bubble forming process is the orchestration of pressures throughout the system, and including in the now initial first stage, through the glass bead chamber. This system is realized by input pressures and controlling them throughout as pressure differentials, with a resultant zero p.s.i., or spent p.s.i. at the discharge end of the application hose. Thus within the glass bead chamber the compressed air will embolize within the liquid medium as pressure decreases. As this air expresses itself through the fluid at a greater relative velocity, air forms move through the fluid, never occupying specific fluid entities, but in fact necessarily maintain themselves by constantly exchanging fluid as they travel the length of the bead chamber. At the terminus of the glass bead chamber is a screen of typically 20 mesh, 20×20 squares per square inch, which holds the beads at this end in check. An incorporation of a square O ring spacer after this screen allows a finer 30 mesh screen to be contained in the glass bead chamber end cap, thus the origin of a second stage bubble reformer. Prior to this arrangement a 20 mesh screen interfaced to a plastic backing sieve with coarse holes allowing migration of the formed bubbles. Now as the terminus is reached migrating and enlarging embolized air forms, must necessarily cease exchanging in the slower moving fluid and carry a locally occupied fluid component outward through the screen squares to form defined bubbles. Because of the dissimilar geometry between the 20 mesh screen squares and the necessary larger diameter of the glass beads, some bead ends protrude into squares, some are on the wire crosses, and in fact are found in all manner of positions making the final bubble defining squares inconsistent. This leads to some degradation in bubble uniformity and also some breakage that leads to reforming into larger bubbles. It has been found from experience that with particular viscosities of fluid, bubbles may be reformed through a second stage 30 mesh screen without injury. By spacing a second 30 mesh screen away from the first 20 mesh screen by means of a square O ring, there is provided an unrestricted entry area in front of this screen's wire squares in which uniform geometry is presented to reform more uniform bubbles. With smaller wire squares, smaller mean average bubble size is also realized.

This understanding of reforming bubbles provided the opportunity of amplifying this concept in a new and inventive way; the development of a third stage bubble generator. After considerable testing, it was found that superior foam could be produced by reforming bubbles some distance away from the second bubble resizing terminal screen. What is most desirable for quality foam is a strong surface tension and small bubble diameters. The typical, but not limited to, expanding agent, calcium chloride salt and water, as a bubble fluid, lacks significant solids. It has been observed that while in a wet state the constituent water wetted to expanding agent and calcium-chloride salt, provides true bubble structure, pressurized and impermeable at the outset. This process may be produced in like kind with magnesium-chloride substituting or combining with calcium-chloride. Within a relatively short span of time, usually within an hour, dehydration and evaporation cause the bubbles' surface tension to weaken to a point where the pressurized air interiors enlarge and break them, leaving fluid remains in their wake. The standard practice before this invented system, was almost entirely dependent on coating the bubbles with solids, both natural and artificial, introduced by a separate cement line, typically including but not limited to magnesium-oxide and talc as primary ingredients with, but not limited to perlite, gypsum, gypsum cement, fly ash, Portland cement, hydraulic cement, calcium hydroxide, calcium carbonate, aluminous cement, and zeolite as adds with a proprietary cement retarder, and the resulting combined product described generally as an oxy-chloride foam cement. The present inventors realized that mineral particle geometry and size are especially important in how successful the integration into bubble surface is accomplished. From extensive testing with the cementous foamed product of Air Krete, Inc., there is reliability in predicting that minerals with a mean average size of 50 micron or less are more likely to be mechanically useful, either in bubble surfaces, or between them. Those minerals with irregular and or acicular forms, if retained at greater than 10% by a 325 mesh screen may be useful as a binder or filler between bubbles, but generally at the detriment of some bubble mass. A new mineral was tested with these properties in mind, a unidensified silica fume with a median particle size of 0.4 micron and also having spherical form. It was hoped that if as in concrete applications, silica fume could fill the voids between the larger solids, where upon curing; this open cell cementous product would result in higher R-values. After testing, it was noted that silica fume between a 4 to 8 pound range, essentially the same as would be a similar percent to total solids on the cement side, caused considerable plugging in the system especially at the cement basket strainer. This is understood to be caused by the agglomeration of silica fume. Numerous studies with electron microscopy and quantified graphical representation show large agglomerates within the silica fume between 10 micron and 100 micron. Undensified silica fume is relatively better dispersed than the densified version, however even the act of shipping causes considerable increase of agglomeration. This particular Norchem™ undensified silica fume used in testing before shipping has a specification that no more than 10% may be retained on a 45 micron (325 sieve). The positive benefits on the other hand are the pozzolanic potentials and the occupation of water. The conclusion reached was that a lesser amount between ½ to 3 pounds was more manageable in the cement side of the system, if in a substantial agglomerated state. This is not to say that larger amounts in an unagglomerated condition wouldn't be useful. Now it was apparent that extremely small spherical particles with a 0.4 median size would be very useful as a solid component carried directly into the bubble surfaces by way of the foam fluid, generally composed of but not limited to calcium-chloride, expanding agent, and water. Initial additions of 2, 4, 6, and 8 pounds were mixed into a premixed foam fluid contained in a 55 gallon open faced plastic drum. After foaming without cement being added, what was encountered was a constant plugging of the glass bead screens and a sooting of the glass beads from the agglomerates of silica fume. However, 5 gallon test pails with a 6 and 8 pound rate to total foam fluid containing 350 pounds of water, maintained pail heights 24 hours later. The conclusion reached was that an unagglomerated portion of silica fume had successfully been integrated into bubble surfaces and had dramatically strengthened the surface tension of said bubbles. This strengthening was thought necessarily mechanical in nature, as that this Norchem™ silica fume requires time before being fully wetted in water, within one hour, that a useful pozzolanic reaction requires a day or more, and that this foam fluid had silica fume added to it and was dispensed within a half hour. Further testing determined that finer screens used than the 30 mesh (30 squares by 30 squares per square inch) only worsened the plugging problems. Pressure gages had been strategically located on bead chamber and the Mixing Wye. It had been known for more than two years previous, that certain pressure readings taken from a position one inch from the glass bead chamber's end, could be used in conjunction with a pressure gage mounted into the Wye mixing chamber to read as pressure differentials and judge certain conditions of the foam and or the cement combined. The application guns have always had pressure gages for the three incoming lines, air and foam fluid at the gun's pressure regulators, and the cement pressure gage, is now located at the pump.

This invention includes a Y Bubble Reforming Generator mounted between the glass bead chamber and the Mixing Wye. The term "Y" will represent the Bubble Reforming Generator and "Wye" the Mixing Wye. The foam pressure differentials between the glass bead chamber and the Mixing Wye without the inclusion of the Y bubble reforming generator, is generally between 20 to 30 psi. An example reading would be 52 psi at the glass bead chamber one inch from the terminus 30 mesh screen and 28 psi at the mixing wye without cement, a differential of 24 psi. Now it is thought that within the last several rows of glass beads, perhaps 6 to 12 rows, a significant portion of this differential is expended. This is judged by viewing pressure differentials of approximately 20 psi from 1 inch in from the beginning of the glass bead chamber and running along 4 inches to within 1 inch of the terminus. We are looking at pressure differentials between 20 and 30 psi over 1 inch of bead chamber length to approximately 20 psi over 4 inches of bead chamber length. If we use a conservative estimation of a pressure differential at say 10 psi occurring in the last several rows of glass beads, then according to Boyle's Law $Va=PcVc/Pa$, where $Va$=volume of gas at atmospheric pressure, $Pc$=compressed pressure (psi, kPa), $Vc$=volume of gas at compressed pressure; $Va=(10\ psi+14.7\ psia)(\text{volume of gas at compressed pressure})/14.7\ psia=1.68\ Vc$. This is to say that for a decrease of 10 psi, the volume of compressed air as expelled into the Mixing Wye should be expanded by 68%. Because a 30 mesh screen had the smallest mesh size for practical use at the glass bead chamber's end and because of a minimal 10 psi pressure differential occurring, limitations were now in effect as to the smallness of median bubble size. Because of this understanding of the terminus 30 mesh circular screen of 1.5 inch diameter, it became apparent that a screen of considerably larger area, preferably 20 to 100 times more and of a finer mesh between 100 and 400 mesh and initially tested with a 80 mesh screen and then followed in testing with a 120 mesh screen, would allow finer median reformed bubbles to be generated. In practice from testing with a Y Bubble Reforming Generator in place between the glass bead 30 mesh terminus screen and the Mixing Wye, excellent results occurred. The functional contributions derived from this particular Y Bubble Reforming Generator may be stated as follows: a differential pressure registrating between 1 to 6 psi, optimally between 1 to 2 psi, a result of 26 times more area, and a 120 screen mesh at 115 microns verses a 600 micron 30 mesh terminus screen. Now as a result of the considered minimal 10 psi pressure differential with a 68% expansion rate resulting, located as expelled compressed air in bubble forms from the terminus 30 mesh screen, the median bubble size is now fixed at a constant psi, normally between 20 to 40 psi at the entrance of our now introduced Y Bubble Reforming Generator. By reforming bubbles over a considerably larger surface area, the blow through velocity, measured as pressure differential, is considerably less. This in itself generates less inflation in bubble forming to a given surface tension of fluid. Smaller median bubble size is the result. Combined with smaller mesh square openings, more of the larger bubbles above the median size are reformed into smaller bubbles. Because of silica fume agglomerates, several methods are commonly used to break up and disperse this mineral. Ultrasonics is favorably used on agglomerates where specifications are critical, such as in paints, plastics, synthetic rubber, adhesives and other products, but bulk processing using ultrasonic equipment requires considerable capital investment. As an addition for concrete mixtures, silica fume remains in large part, agglomerated. What is used in practice is a basic dispersement technique, tumbling silica fume in a water and gravel mix before other components are introduced. Now it was discovered that when rotor-stator mixing, the exothermic energy of calcium-chloride in water caused dispersement and some considerable unagglomeration of silica fume. However, using in this instance a 120 mesh screen in the Y Bubble Reforming Generator, even with its much greater surface area, what occurred was that agglomerates of silica fume gradually filled the screen squares. This initially was overcome by simply rinsing out the 120 mesh screen from time to time with water. From a invented combination of new minerals as additions, in this case, silica fume at 0.4 micron median size being introduced into the foam fluid effectively, 8 micron median size wollastonite introduced on the cement side of the system, and with a mechanical conveyance, the Y Bubble Reforming Generator reducing median bubble size, the result from a sample provided to Dynalene Inc. Laboratory, was an insulation R-value of 6 per inch of thickness as tested May 22, 2013.

Several new and invented techniques to unagglomerate and disperse silica fume, or remove agglomerated silica fume, were discovered within a span of several months after obtaining the test result of an R-value of 6 per inch. By realizing the energy importance from the exotherm of calcium-chloride in unagglomerating and dispersing silica fume, more attention was paid to the proper sequencing of silica fume to water and salt, and length of time mixing the silica fume during the exotherm, while maintaining between 600 to 1500 rpm with a rotor-stator mixer. It has been found advantageous to add silica fume or silica fume with minerals of similar size first to the water and exotherming calcium-chloride, immediately after the inclusion of the salt, and mix for a period of not less than 15 minutes, and by mixing in the expanding agent at a lesser rpm between 200 and 500. This may be done to a full measure of water or in part, with the balance of water added before the inclusion of expanding agent. It was discovered that by replacing the suction strainer with a larger unit having a finer screen cartridge, between 100 and 200 mesh per inch, and recycling the contents of the mixing barrel, typically 55 gallons, either after or some length of time during the exotherm of calcium-chloride and before the inclusion of the expanding agent by means of the diaphragm pump, much of the agglomerates of silica fume were further dispersed or trapped in the suction strainer screen. By removing and rinsing this screen and then reinserted, this particular foaming maintenance requirement was met. Optionally, recycling may be accomplished by a mounted pump unit at the mixing barrel. These recycling methods provide a means to further mix the foam fluid components initially accomplished by rotor-stator mixing. This has been found to be an important consideration. Because of stronger surface tension properties associated with the addition of silica fume and other minerals, what has become apparent especially in low foam fluid levels in the mixing barrel, is that a rotor-stator conveyance must properly present a propeller height, form and rpm specifically tailored to avoid the possibility of entraining air into the mix at this stage. Entrained air is not particularly useful in maintaining a consistent prime and flow of foam fluid in the dispensing line to the application gun. The suction strainer as used is necessarily drawing and dependent upon its prime to function. What has been discovered that by changing the position of the strainer from the suction side to the discharge side of the pump, no longer was maintaining pump prime a limiting factor in screen mesh fineness or the introduced increased straining areas. Several varieties of wye strainers of different gallon per minute capacities were investigated for their usefulness, among them those using disk stack cartridges, polyester and stainless steel screened cartridges. A convenient location, but not limited to, is mounting the unit on the diaphragm pump platform on the discharge side. This allows a larger strainer with finer mesh size, typically between 120 and 250 mesh, to be positioned out of the immediate vicinity of the bubble fluid mixing barrel. A bag filter is another option on the discharge side, where a larger volume of bubble fluid may be processed. In combination with a wye suction strainer having a coarse mesh, or not using this strainer at all, efficient removal of agglomerates is now possible, with less cleaning maintenance of the Y Reforming Generator. Now with the discovered improved methods of utilizing silica fume in the foam liquid, other inorganic solids of comparable median size were sampled and tested. Among them was kaolin from the state of South Carolina of an exceptionally refined purity and having a 0.2 micron median particle size. Introduced to the foam liquid in amounts ranging from 0.5 to 20 pounds to 350 pounds of water, the remaining smaller agglomerates of silica fume were better dispersed within the bubble fluid material. The resultant median bubble size produced appeared visibly smaller. Further additions of silica fume between 1 to 18 pounds, were now possible with the conditions as above described. There is always a delicate balance between heat conductivity from the mineral components involved, generally a loss of R-value, and maximizing the isolation of air cells, derived from the mechanical assemblies of these same mineral components, for generally a higher R-value.

Another method tested was the unagglomerating and dispersion of silica fume by the mixing hydrogen-peroxide into the expanding agent. The expanding agent is comprised of two separate fluids of a proprietary nature that may be combined or held separately apart prior to being mixed into the calcium-chloride salt and water. Prorated for full barrel, 1 pint to 5 gallons additions in tests of 3 to 6 percent hydrogen-peroxide, were made for expanding agent necessary for a half barrel mix. The results were satisfactory, especially the proper dispersement of the silica fume. This unique introduction of silica fume into the expanding agent is important because this allows a premixed expanding agent with silica fume and other similar median sized inorganic solids to be distributed to job sites and easily added to the foam fluid without measurement or handling, other than inclusion.

With kaolin introduced successfully to both sides of the system, a calcined kaolin, metakaolin, with a median size of 1.2 microns was tested and a 4.2 micron zeolite was also tested. These minerals have pozzolanic properties much like silica fume and again, especially useful in the concrete industry. It became apparent that chemical reactions outside the oxy-chloride cement processes were not necessarily at cross purposes to the success of this cemententious foam. A small amount of free calcium, such as is available from the calcium chloride on the foam side with possible further calcium derivatives added, and on the cement side with wollasonites, additions of moderate amounts of calcium hydroxide, and or other forms able to bring calcium into involvement with silica fume and or zeolite, and or metakaolin, and or pumice, was found useful because of the calcium silicate hydrates produced. Further experimenting with suitable grades of zeolite, metakaolin, and pumice, having fineness of median size, and the potential of free calcium on both sides of the process, were tried on both sides, foam and cement. The results were promising as to the closing of pore structure and overall increased strength of this cemententious foam. Other pozzolans of similar micron size may proof useful in this cementitious foam. Another promising mineral experimented with on both sides is fine sized gypsums. EXAMPLES in the Detailed Description are provided giving a wider range of materials that have merit.

Several further mechanical improvements to this cementitious cement foaming process are now included. It has been known that a surplus waste air is conveyed throughout the process; first observed in the translucent housing of the bead chamber and further observed as expelled air at the discharge end of the application hose. This waste air expels itself freely in its majority to the surrounding air. However, a certain small amount may in fact cause occlusions in the product. The bead chamber's bead pack is efficient as a geometric matrix designed to emblemize and break up air as this air moves through the slower moving fluid. However, the interior surface of the cylindrical chamber is a smooth polycarbonate thermoplastic and the beads are not able to occupy this local surface as efficiently as against their individual selves. Thus several ways to disperse this air are now revealed. By inserting a polyester, polypropylene, or stainless steel screen of typically 50 to 100 meshes against this interior surface, as the beads are packed into the chamber, some of their points of contact reside against or are radiused into some portions of the wire meshes. The result is a more disruptive surface to air flow and especially to the cross section of continuous squares. A rubberized or plastic material would work in a similar fashion, with the glass beads seating into the material. A mechanical knurling or threading of the interior surface would also accomplish much of the same.

As mentioned, a 20 mesh followed by a 30 mesh screen separated by a square O ring at the terminus end of the bead chamber provides the second stage in bubble reforming, however previously limited in fineness to a 30 mesh end screen. It is now possible with the invented improved techniques eliminating most agglomerates, to introduce finer 40 to 80 mesh screens not previously possible. This newly discovered capability, improves the bubble generating process by culling larger bubble outliers from the bead chamber into more manageable intermediate sizes for reforming through the Y Bubble Reforming Generator.

Integrated into this new invented process are several mechanical improvements previously developed, but considered important for inclusion as process components necessary for the present invention. The diffusion spinner was developed after considerable number of spray testing hours. The premise being, a hollow cone pattern produces best small droplet size verses a solid cone spray pattern. Once again the original spinner of use was designed in Germany during the 1930's for the application of urea formaldehyde foam. The improved spinner has a stainless steel back plug to stop back boring of fluids through it. The improved spinner is flat nosed giving maximum leverage in bringing fluid to a center orifice chamber through its grooves, and forcefully directed to engender rotation of the fluid contained therein. Now as the fluid is swirled within the orifice chamber, centrifugal force and the waiting orifice, force the fluid to conform to a dispensed spiral hollow cone pattern. This presentation is good, droplet size being of a fine quality, but the negative quality to a presented bubble pack is the thinness of spray area and concentration of cement within this area. Cutting into the bubble pack is the result. The diffusion spinner derives its name from widening this hollow cone pattern without coarsening the droplet size. The four alley ways coming into the chamber are directed to the interior wall of the orifice chamber. By milling the upper portion of the alley ways in a parallel configuration to a larger circle of entry into the orifice chamber, but stopping in a radius directed to the center axis of the orifice, the top halves of the incoming fluid columns are deflected inward to a point of widening the hollow cone pattern. By boring out the diameter of the orifice chamber a small amount, a further widening and softening of the orifice spray pattern was achieved.

The cement orifice has been significantly improved as to its precision, durability and capacity. An artificial sapphire that is CNC laser cut is seated into the cement orifice body with an enlarged discharging internal diameter. To complement the increased capacity of the cement orifice, the expanding agent orifice internal discharging diameter size has been increased by the same amount.

According to one aspect is a system for manufacturing and distributing a cementitious foam, the system including: (i) a source of bubble fluid; (ii) a source of compressed air; (iii) a source of cement; and (iv) a foam generation and distribution gun having an upstream end and a downstream end; a first elongated chamber of a first diameter and in which a plurality of bubble forming media are contained and that extends between a first end portion positioned adjacent to the upstream end, and an opposite second end portion; first and second conduit for carrying the bubble fluid and the compressed air, respectively, to the first end portion, wherein a mixture of bubble fluid and compressed air is generated and forcibly passed through the first elongated chamber at a first pressure, whereby upon exiting the first chamber a foam fluid is formed from the compressed air and bubble fluid; a second chamber extending from the first elongated chamber and in which a first foam fluid reforming structure is contained, whereby the foam fluid is reformed as it exits the second chamber; a third chamber extending outwardly from the second elongated chamber and in which a second foam fluid reforming structure is contained and through which the foam fluid passes, wherein the foam fluid is at a second pressure lower than the first pressure upon entering the third chamber and at a third pressure equal to the second second pressure upon exiting the third chamber; a foam distribution conduit positioned downstream from the third chamber; and a third conduit for carrying the cement to the foam distribution conduit, wherein the cement is combined with the foam fluid prior to passing through the foam distribution conduit, wherein the cement and foam fluid combination are mixed together at a fourth pressure lower than the second and third pressures.

According to another aspect is a foam generation and distribution gun including: (i) an upstream end and a downstream end; (ii) a first elongated chamber of a first diameter and in which a plurality of bubble forming media are contained and that extends between a first end portion positioned adjacent to the upstream end, and an opposite second end portion; (iii) first and second conduit for carrying the bubble fluid and the compressed air, respectively, to the first end portion, wherein a mixture of bubble fluid and compressed air is generated and forcibly passed through the first elongated chamber at a first pressure, whereby upon exiting the first chamber a foam fluid is formed from the compressed air and bubble fluid; (iv) a second chamber extending from the first elongated chamber and in which a first foam fluid reforming structure is contained, whereby the foam fluid is reformed as it exits the second chamber; (v) a third chamber extending outwardly from the second elongated chamber and in which a second foam fluid reforming structure is contained and through which the foam fluid passes, wherein the foam fluid is at a second pressure lower than the first pressure upon entering the third chamber and at a third pressure equal to the second second pressure upon exiting the third chamber; (vi) a foam distribution conduit positioned downstream from the third chamber; and (vii) a third conduit for carrying the cement to the foam distribution conduit, wherein the cement is combined with the foam fluid prior to passing through the foam distribution conduit, wherein the cement and foam fluid combination are mixed together at a fourth pressure lower than the second and third pressures.

According to another aspect is a method for making and distributing a cementitous foam, the method including the steps of: (i) providing sources of bubble fluid, compressed air, and cement; (ii) delivering the bubble fluid and the compressed air to the upstream end of a foam generation and distribution gun where they are mixed; (iii) passing the mixture of bubble fluid and compressed air through a first elongated chamber that is filled with bubble forming media at a first pressure, thereby forming a foam fluid as it exits the first elongated chamber; (iv) passing the foam fluid through a second chamber wherein the foam fluid is reformed a first time; (v) passing the first reformed foam fluid through a third chamber that extends downstream from the second chamber, wherein the first foam fluid is reformed a second time and at a second pressure lower than the first chamber; (vi) delivering and combining the cement with the second reformed foam fluid in a conduit positioned downstream from the third chamber, thereby forming a cementitous foam; and (vii) distributing the cementitious foam from a conduit.

According to another aspect is cementitious foam composition, which includes a mixture of: (i) a first solution of water, a salt, silica fume, and an expanding agent; and (ii) a second solution of water, magnesium oxide, and a mineral.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 3:
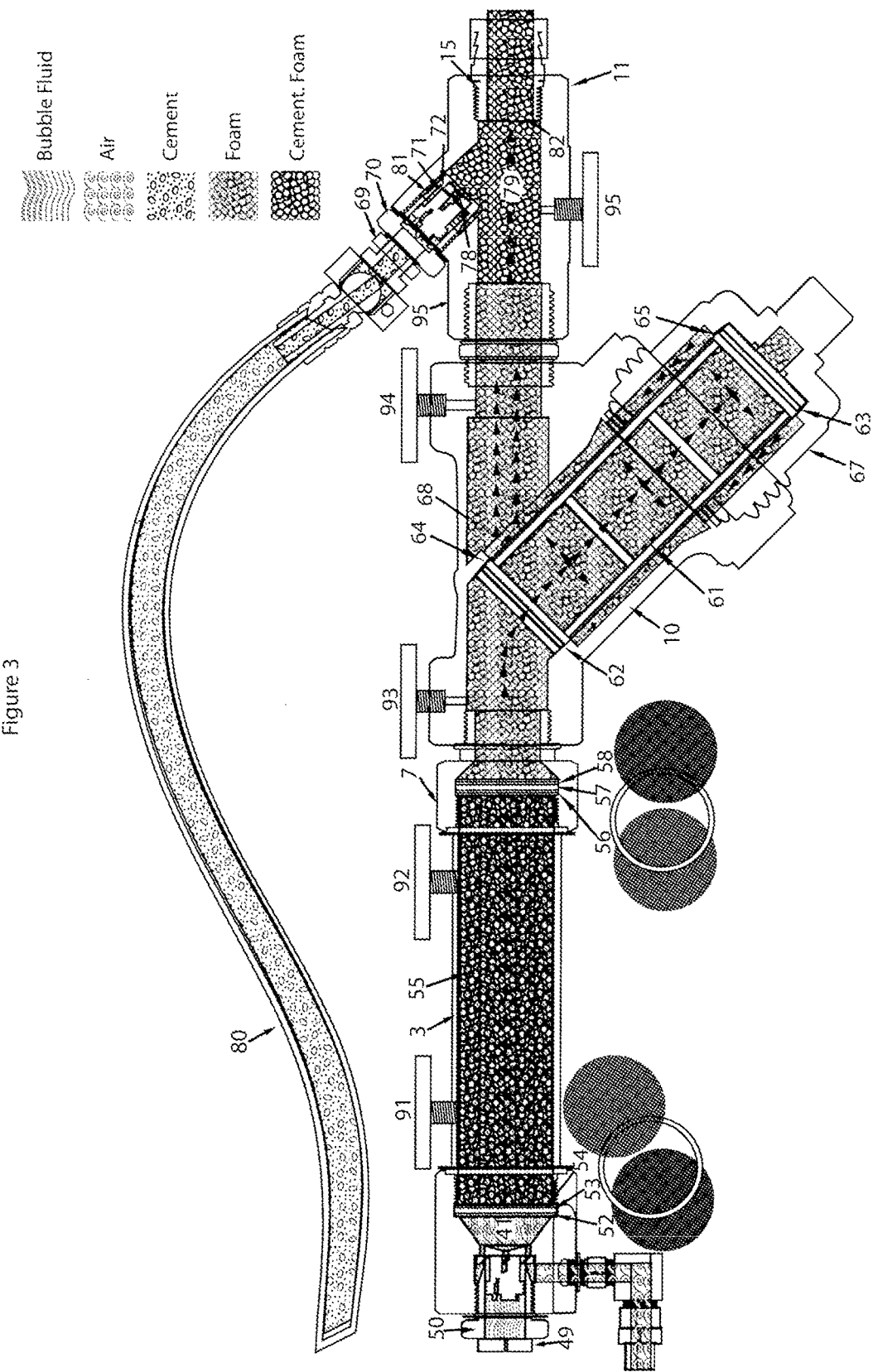

FIG. 3 is a sectional view of the invented three stage bubble generating system contained in end cap 6, bead chamber 3, end cap 7, Y Bubble Reforming Generator 10, and Mixing Wye 11. This view also displays the three components and their conveyance into, through, and out of the system.

Figure 4:
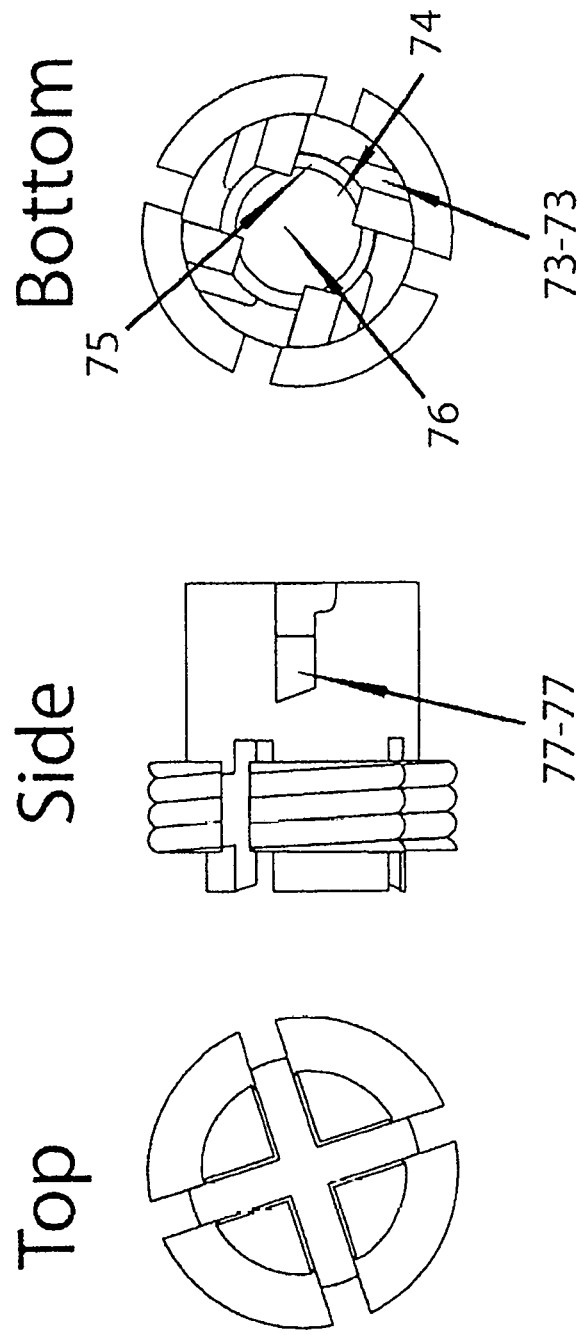

FIGS. 4a, 4b, and 4c are top, side, and bottom views of identical diffusion spinners 51 and 71, respectively.

Figure 5:
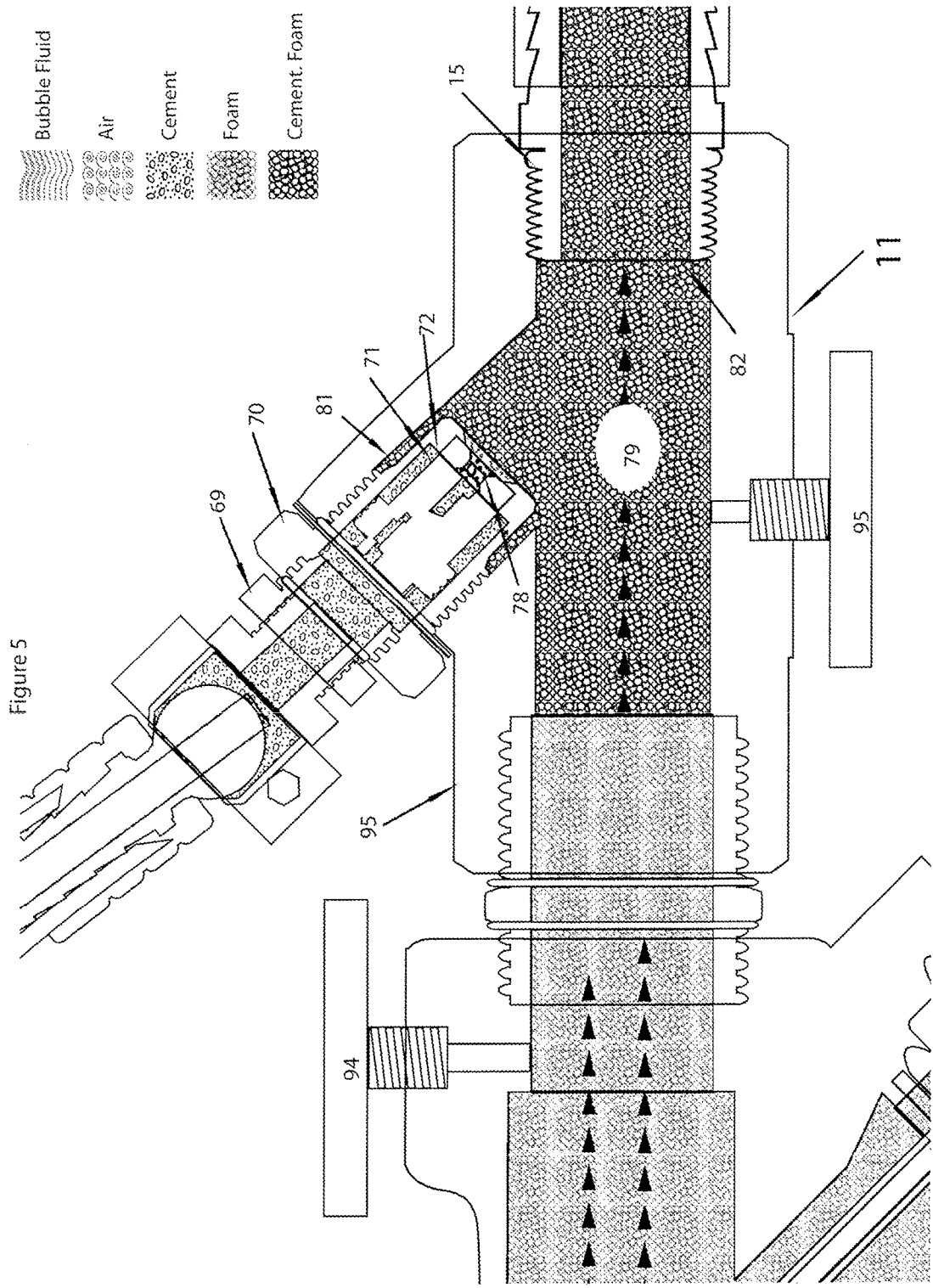

FIG. 5 is a sectional view of Mixing Wye 11, including cement orifice 78, spinner 71, and deflection ring 82 as represented in hose barb 15.

DETAILED DESCRIPTION

The present invention relates to cementitious foam which is useful for insulation. This insulation can be used in cavities, such as found between walls, within or between foundation materials, or in open spaces such as attics. This foam is useful for both new and existing constructions.

The cementitious foam is produced through the combination of three components. The first component is an aqueous solution of calcium-chloride and or magnesium-chloride, expanding agent of a proprietary nature, with the addition of but not limited to, silica fume and other similarly sized minerals such as kaolin, metakaolin, zeolite, artificial zeolite, pumice, gypsum and calcium derivatives. The second component is compressed air. When forced through and embolized within the first aqueous solution the resultant necessary bubbles are produced by means of an invented progressive bubble generating system. The third component consisting of an aqueous solution of magnesium-oxide and talc or not, with the additions of but not limited to, minerals such as wollastonite, artificial wollastonite, silica fume, metakaolin, kaolin, zeolite, artificial zeolite, pumice, perlite, gypsum, gypsum cement, fly ash, Portland cement, hydraulic cement, calcium-hydroxide, calcium-carbonate, aluminum cement, potassium-silicate, sodium-silicate and a proprietary cement retarder. The third component referred to as the cement and dispensed from a cement line, is forcefully sprayed on and through the bubble pack by means of a spinner and orifice, coating and filling in between the individual bubbles.

Figure 1:
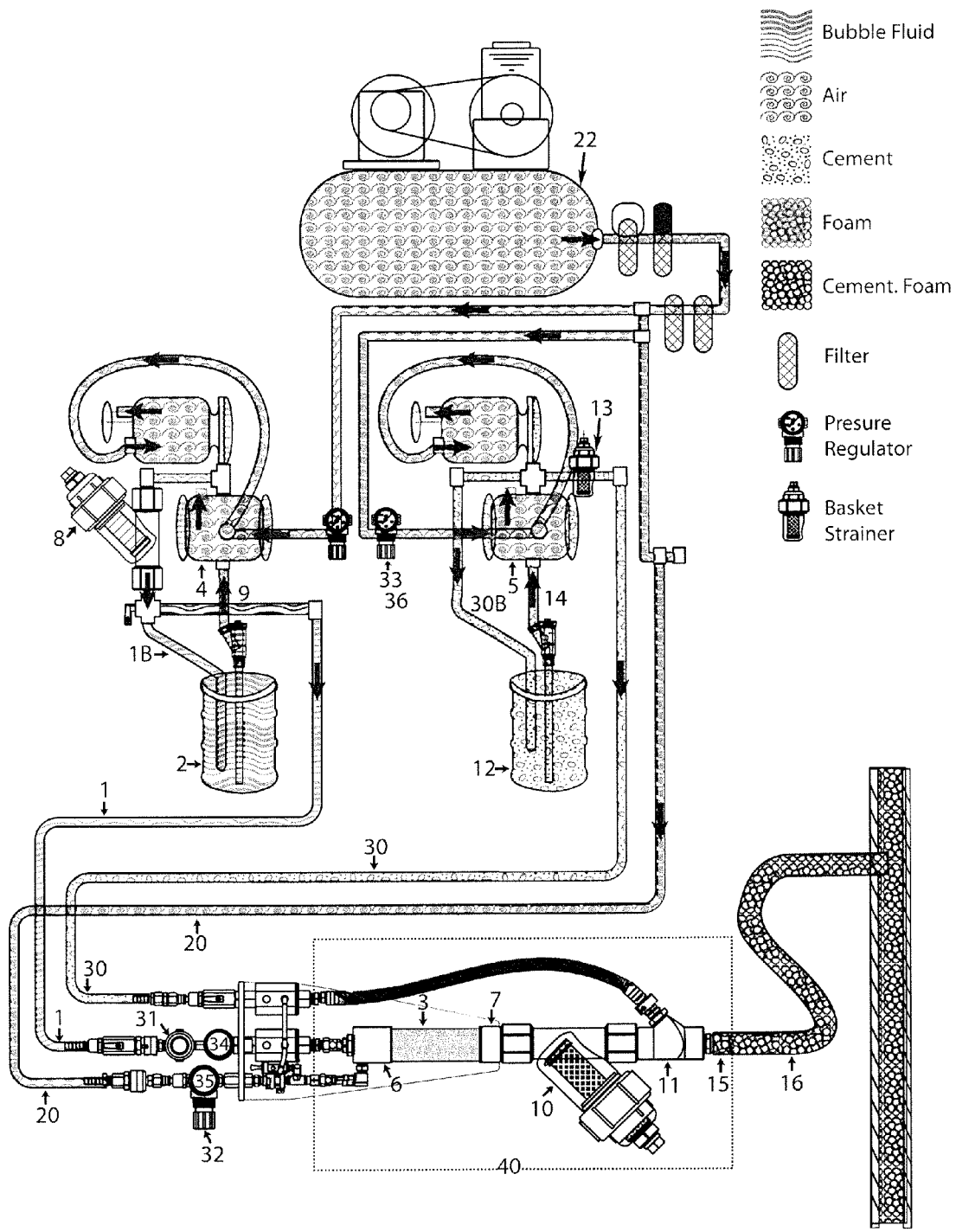
FIG. 1 is a schematic view of the mechanical devices assembled in a typical arrangement for the production of cementitious foam and also views the three components of the process and their directional paths throughout the process.
Figure 2:
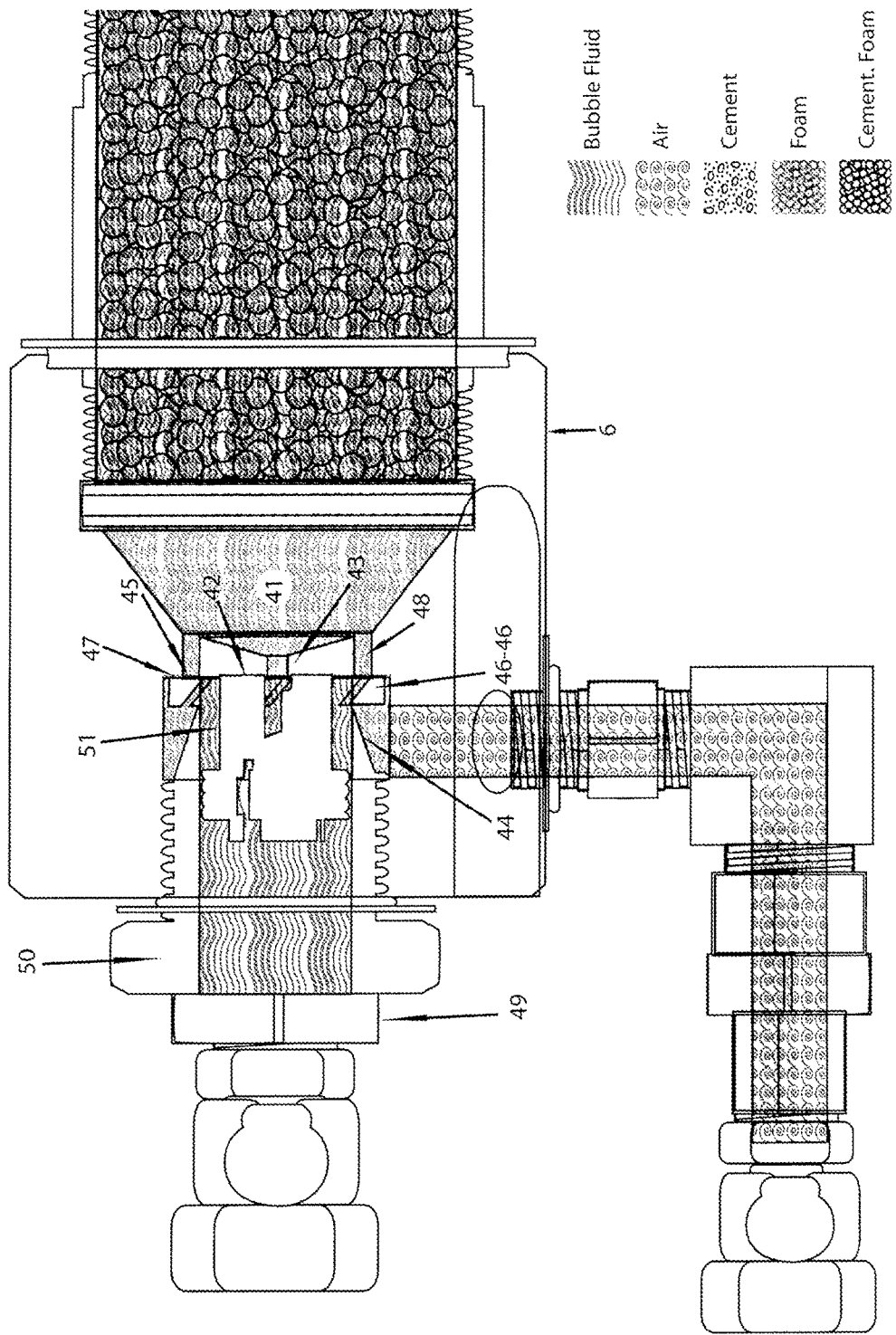
FIG. 2 is a sectional view of end cap 6 displaying the mechanical parts and geometry contained within. Included is a partial sectional view contained within an external view, of parts attached to the end cap.

With reference to the drawings, and in particular, to FIG. 1, there is shown a foaming gun system 40 for the manufacturing and dispensing a three component foam. The first component is the bubble fluid, containing calcium-chloride, expanding agent, small inorganic mineral solids and water, represented by dispensing line 1 and pumped from a 55 gallon barrel 2, utilizing diaphragm pump 4. This bubble fluid is routed into a bead chamber 3. The chamber is contained by ends, 6 and 7. A second line 1B, on the discharge side of pump 4, has a wye strainer 8 with a large surface area and fine straining capacity. On the suction side of the pump is a smaller wye strainer 9, with coarser straining abilities for large particulates. This strainer may be left out of the suction side, because of wye strainer 8's efficiency.

The second component is compressed air sourced from 22, and conveyed in line 20 to glass bead chamber end cap 6 for primary mixing with the first component. From this mixing within the end cap 6, these two components are forced under both air pressure and liquid pumped pressure through the first stage bubble forming glass bead chamber 3 into end cap 7, having passed through the second stage reforming screens depicted later in FIG. 3. This now formed bubble pack is carried under continued pressure of a lesser differential, into the Third Stage Bubble Reforming Generator 10, whereupon entering and exiting, has a slight change of pressure. The bubble pack has now been reformed for a third and final time. This bubble pack is then forced forward under continued pressure into the Mixing Wye 11.

The third component is the cement, dispensed to the gun in line 30, under pressure from diaphragm pump 5, and drawn from a 55 gallon barrel 12. On the discharge side is a basket strainer 13, and on the suction side, a wye strainer 14, that if used will have a coarse mesh screen. There is also a recirculating prime line 30B, on the discharge side of pump 5. The third cement component is forcibly dispersed in a semi hollow cone spiral spray pattern into the bubble pack to coat the bubbles and fill in between them, as mechanically depicted in FIGS. 3 & 5.

The three combined components are further transported under pressure, although of a further diminished degree, into the hose barb 15, and then into the final conveyance, the application hose 16, to exist at its end as cementitious foam.

Bubble fluid regulator 31 and air regulator 32 on the gun, with a cement regulator 33 regulating by use of air over fluid on the pump, are the means to control the three components in there disposition to each other. Bubble fluid pressure gage 34, and air pressure gage 35 on the gun, with the cement pressure gage 36, at the pump reading air over fluid pressure, is the means of evaluating the three component proportions.

FIGS. 2-5 describe the application gun's assembly of parts and their individual involvement in greater detail. As bubble fluid is pumped under pressure, typically 130 p.s.i. within a line, it enters a regulator and is normally metered between 75 to 100 p.s.i. Viewed in FIG. 2, upon exiting, this fluid is directed toward the expanding agent orifice body 50, through reducer bushing 49. Upon entering the orifice body, it finds itself meeting the seated diffusion spinner 51 on the bottom of a threaded cylindrical cavity 42. The seated diffusion spinner, its nose flush to the bottom of the cavity has effectively sealed itself off against this bottom. However, four compound slots have been machined 90 degrees apart and off center to the central axis of the part as depicted. This forces the bubble fluid under pressure to confine itself and be directed through these slots. The diffusion spinners may be formed in either clock wise or counterclockwise configurations, and in this case, clockwise, as viewed from the back of the gun looking forward. As the bubble fluid jets through these compound slots, the four separate streams meet in a small internal dispensing chamber and combine once again for a high velocity spiraled exist through the orifice 43, having a small diameter. Detailing of the diffusion spinner and the droplet pattern generated will be included in the description of identical diffusion spinner 71. The expanding agent orifice body 50, in its external configuration has been designed to integrate within end cap 6 in such a manner as to allow regulated compressed air, typically between 75 to 100 p.s.i., to enter through the side of the cap into a region of void or recess 44, on the body of the orifice. In front of this recess is a collar 45 with multiple slots 46-46 machined at an inclined angle to the central axis as shown. The collar's outer periphery is against the end of the threaded bore 47 within the end cap 6, for sealing off this end portion, but allowing air and backed up bubble fluid through the inner circle of open slot areas in a spiraled and violent manner through a smaller bore 48, and to combine with the continuously sprayed bubble fluid from the centralized orifice 43. This amalgam is forced forward into a confined chamber 41 within end cap 6. As viewed in FIG. 3, the chamber is confined by a previously inserted end screen 52, typically of 30 mesh, separated by a square O ring 53 and a second screen 54 of typically 20 mesh. This second screen 54 retains the glass beads 55 at this end of the glass bead chamber 3. Glass bead chamber 3, previously invented, is a useful first stage bubble forming unit of the present invention. Within the chamber are 2 mm glass beads 55, of consistent size, surface, and roundness. These beads are packed in a deliberate manner to have a uniform matrix. As pressurized bubble fluid enters the chamber through screen 54, and likewise, so does compressed air, now interspersed with this bubble fluid. Typical pressure as read by a test gage 91 one inch into the bead pack of the combined air and bubble fluid is between 60 and 80 p.s.i. depending upon the regulated entry pressures of the now combined two components. If we treat air as a fluid, its viscosity is much less than that of the bubble fluid. It has been observed by looking through the translucent bead chamber 3, that air forms move at a faster rate through the bead matrix than does the bubble fluid. This is of particular advantage in that this embolized air, ever expanding as pressure declines, moves forward, and moving through the slower bubble fluid, it stretches and forms bubbles upon exiting through a 20 mesh screen 56, by a mechanical process somewhat similar to blowing bubbles through a hoop. A test pressure gage 92, one inch from the end of the bead chamber typically registers approximately 20 p.s.i. less than test gage 91. The further significance of the bead pack is its ability to disperse the two components because of its length and width as confined within the bead chamber. The glass bead chamber 3, typically has a cylindrical interior of 1⅜ inches in diameter by 6 inches in length, derived from many experiments studying pressure differentials along the bead pack, in combination with pressure gage readings of back pressure further downstream within the system. This proportioning can however be scaled up for a greater quantity of product.

The glass beads 55 are retained in the glass bead chamber 3 by end screen 56, separated by a square O ring 57, and a 30 mesh second screen 58, as seated in end cap 7. This last screen 58, represents the second stage in the progressive bubble generating system. Because of the newly discovered processes for the proper dispersement, unaglomeration, and straining out of unwanted solids within the bubble fluid, this second stage bubble reformer may now consist of a finer screen of 40 to 80 meshes, not previously useable before. Bubbles formed from the bead chamber and through retaining screen 56, may now be reformed into smaller bubbles in an unobstructed manner through screen 58. The typical glass bead chamber pressure readings one inch from its terminus from test gage 92, is 40 to 60 p.s.i., and the range of gaged pressures from test gage 93, entering the invented third stage Y Bubble Reforming Generator 10, is usually between 20 and 40 p.s.i.

Y Bubble Reforming Generator 10 consists of a straight run to an entry into a Y that is cored to the interior of a screened cartridge 61, and that is sealed on its ends by means of O rings 62, 63 to tapered recesses 64, 65, contained within the body of the Y and within the end cap 67. The reformed bubbles from screen 58 are at a consistent p.s.i. and are now closely packed together in what would recognizably be termed foam. As the foam is pushed into the internal area of the screened cartridge 61, there is found to be a generous surface area of between 8 to 100 times greater than the second stage screen 58. The screen is of fine meshes between 100 and 400 per linear inch. The screen material may be either stainless steel or polyester. As a result of strengthening the surface tension of bubble fluid from the inclusion of specifically shaped, and generally, smaller than five micron sized solids, such as silica fume, the foam pack is successfully reformed for a third and final time. The individual bubbles of the foam pack are reformed in a manner friendly to their survival and as they emerge are of a smaller median size. This is due to the small differential pressure acrossed the screen meshes, usually between 1 to 4 p.s.i. and in combination with mesh fineness. The reformed foam or bubble pack is pushed back in a reverse direction between the outer area of cartridge screen and the internal wall of the Y, toward and exiting through a portal 68, located in line with coupled Mixing Wye 11. The pressure as indicated from a test gage 94 in the exiting portion of the Y Bubble Reforming Generator is generally between 20 and 40 p.s.i.

Upon entering the Mixing Wye 11, the bubble pack, under a constant similar pressure as recorded by a pressure test gage 95, and as previously read at the exiting portion of the Y Bubble Reforming Generator by test gage 94, is thoroughly mixed with an aqueous solution of cement that coats and fills between the bubbles in such an integrated manner as to cause the Mixing Wye pressure to decrease by several p.s.i. This is explained by understanding that pressure recorded in the Mixing Wye 11 is the remaining pressure being resisted as back pressure in the downstream application hose 16, FIG. 1, typically ⅞ inch in diameter by 10 to 12 feet in length. This resistance is lessened because of the lubricity or wetter quality of the added cement, having as its vehicle, a considerable amount of water.

There is a cement dispensing line 80, continuance of 30, FIG. 1, mounted to an application gun control valve and ending in a cement reducer bushing. As viewed in FIG. 5, the cement upon entering through the reducer bushing 69, is now within the interior of the cement orifice body 70, where it is confronted with diffusion spinner 71, seated in the bottom of this cylindrical cavity 72, and threaded to it. The diffusion spinner 71, as mentioned, is identical to 51. In FIGS. 4a-4c, four slots 77-77, have been formed 90 degrees apart in a radial fashion offset to the central axis and entering the interior wall of a small internal dispensing chamber 74. There is in unison with these slots an enlargement of them in their upper portions by parallel radii slots 73-73, on the outside perimeter, ending also as concluding radii, exiting into this dispensing chamber in line to the central axis of the orifice opening. A stainless plug 76 has been press fitted into the back of the chamber to withstand the boring back pressure of the contained aqueous cement. The diameter of the chamber has been enlarged slightly represented by wall 75. These modifications to the original spinner have allowed a spiraled hollow cone pattern to be broader in its cross section by forcing some aqueous cement to a more centralized location within chamber 74 via 73-73, and another portion, to a larger outer perimeter within chamber 74, represented by wall 75, and thus discharge more broadly through the orifice. Viewed in FIG. 5, the orifice 78 is laser cut from an artificial sapphire, typically having a 120 diameter opening. This diameter may be increased for up scaled configurations necessary for more volume of product. The cement orifice 78 contained in body 70, are internally presented by means of a threaded bore 81 in the Mixing Wye 11, at 45 degrees to a central bore, 79. The resulting spray pattern of cement dispensed from orifice 78, is a spiraled semi hollow cone pattern to the bubble pack flow. Regarding its spiraled nature, the cone form is clockwise in rotation, looking toward the hose barb 15. There is a deflection ring 82, which is defined by the end of the threaded section of hose barb 15, threaded into the Mixing Wye 11. The function of the deflection ring is to fold the acute angled spiral, typically from 15 to 25 degrees, into a compact and revolving helix that rolls over and through the bubble pack. The joined stream of mixed cement and bubble foam, is now recognizable as cementitious foam, and is routed through hose barb 15 into the application hose 16, FIG. 1, and dispensed out its end.

Among the cementitious foams that may be produced are EXAMPLES, using the following compositions listed below. Both mineral components and water are listed as pound weight measurements. An aqueous solution of calcium-chloride, and or magnesium-chloride, expanding agent of a proprietary nature, and with small minerals; will be represented as the First Component. This First Component is typically mixed in a quantity with 350 pounds of water; sufficient to be combined with approximately 6 barrel mixes of the Third Component each typically containing 150 to 175 pounds of water. Compressed air will represent the Second Component. The compressed air of the Second Component is essentially and quantitatively the same in the EXAMPLES given, and therefore not listed. An aqueous solution of magnesium-oxide and talc or without talc, with the additions of other minerals, will represent the Third Component, and also includes a proprietary cement retarder typically between 1 to 5 pounds in each of the EXAMPLES, but not individually listed in these EXAMPLES. Water temperatures are between 45-70 degrees Fahrenheit for the EXAMPLES. Microns given represent median sizes in the EXAMPLES. The expanding agent used in the EXAMPLES is of a proprietary nature. The Second Stage Bubble Reformer in the EXAMPLES is of 30 meshes, and if otherwise, will be listed individually in those EXAMPLES.

Example 1

120 Meshes Per Inch, Third Stage Y Bubble Reforming Generator

First Component

| | |
|---|---|
| 350 lb. | water |
| 100 lb. | calcium-chloride (83-87%) |
| 2.5 lb. | silica fume (.4 micron) |
| 90 lb. | expanding agent |

Third Component

| | |
|---|---|
| 150 lb. | water |
| 4 lb. | wallastonite (8 micron) |
| .5 lb. | silica fume (.4 micron) |
| 55 lb. | magnesium-oxide (5 micron) |
| 50 lb. | talc (9 micron) |

Example 2

120 Meshes Per Inch, Third Stage Y Bubble Reforming Generator

First Component

| | |
|---|---|
| 350 lb. | water |
| 100 lb. | calcium-chloride (83-87%) |
| 2.5 lb. | silica fume (.4 micron) |
| 6 lb. | kaolin (.2 micron) |
| 90 lb. | expanding agent |

Third Component

| | |
|---|---|
| 150 lb. | water |
| 4 lb. | wallastonite (8 micron) |
| 4 lb. | kaolin (.2 micron) |
| .5 lb. | silica fume (.4 micron) |
| 55 lb. | magnesium-oxide (5 micron) |
| 50 lb. | talc (9 micron) |

Example 3

200 Meshes Per Inch, Third Stage Y Bubble Reforming Generator

First Component

| | |
|---|---|
| 350 lb. | water |
| 75 lb. | calcium-chloride (83-87%) |
| 4 lb. | silica fume (.4 micron) |
| 6 lb. | kaolin (.2 micron) |
| 90 lb. | expanding agent |

Third Component

| | |
|---|---|
| 150 lb. | water |
| 4 lb. | wallastonite (2.8 micron) |
| 4 lb. | wallastonite (8 micron) |
| 5 lb. | metakaolin (2.1 micron) |
| 1 lb. | silica fume (.4 micron) |
| 55 lb. | magnesium-oxide (5 micron) |
| 50 lb. | talc (9 micron) |

Example 4

200 Meshes Per Inch, Third Stage Y Bubble Reforming Generator

First Component

| | |
|---|---|
| 350 lb. | water |
| 75 lb. | calcium-chloride (83-87%) |
| 6 lb. | silica fume (.4 micron) |
| 2 lb. | kaolin (.2 micron) |
| 90 lb. | expanding agent |

Third Component

| | |
|---|---|
| 150 lb. | water |
| 4 lb. | wollastonite (8 micron) |
| 5 lb. | zeolite (4.5 micron) |
| 5 lb. | metakaolin (2.1 micron) |
| 1 lb. | calcium-hydroxide (4 micron) |
| 55 lb. | magnesium-oxide (5 micron) |
| 50 lb. | talc (9 micron) |

Example 5

200 Meshes Per Inch, Third Stage Y Bubble Reforming Generator

First Component

| | |
|---|---|
| 350 lb. | water |
| 75 lb. | calcium-chloride (83-87%) |
| 6 lb. | silica fume (.4 micron) |
| 2 lb. | kaolin (.2 micron) |
| 4 lb. | gypsum cement (5 micron) |
| 90 lb. | expanding agent |

Third Component

| | |
|---|---|
| 160 lb. | water |
| 4 lb. | wollastonite (8 micron) |
| 5 lb. | zeolite (4.5 micron) |
| 5 lb. | metakaolin (2.1 micron) |
| 1 lb. | silica fume (.4 micron) |
| 2 lb. | calcium-hydroxide (4 micron) |
| 55 lb. | magnesium-oxide (5 micron) |
| 50 lb. | talc (9 micron) |

Example 6

200 Meshes Per Inch, Third Stage Y Bubble Reforming Generator

First Component

| | |
|---|---|
| 350 lb. | water |
| 75 lb. | calcium-chloride (83-87%) |
| 4 lb. | silica fume (.4 micron) |
| 6 lb. | kaolin (.2 micron) |
| 10 lb. | metakaolin (2.1 micron) |
| 90 lb. | expanding agent |

Third Component

| | |
|---|---|
| 150 lb. | water |
| 4 lb. | wallastonite (2.8 micron) |
| 6 lb. | kaolin (.2 micron |
| 1 lb. | silica fume (.4 micron) |
| 55 lb. | magnesium-oxide (5 micron) |
| 1 lb. | calcium-hydroxide (4 micron) |
| 50 lb. | talc (5 micron) |

Example 7

200 Meshes Per Inch, Third Stage Y Bubble Reforming Generator

First Component

| | |
|---|---|
| 350 lb. | water |
| 100 lb. | calcium-chloride (83-87%) |
| 2.5 lb. | silica fume (.4 micron) |
| 2 lb. | hydrogen-peroxide (3%) |
| 90 lb. | expanding agent |

Third Component

| | |
|---|---|
| 150 lb. | water |
| 4 lb. | wallastonite (2.8 micron) |
| 5 lb. | perlite (less than 10% retained on 325 mesh screen) |
| 55 lb. | magnesium-oxide (5 micron) |
| 50 lb. | talc (9 micron) |

Example 8

200 meshes per inch, Third Stage Y Bubble Reforming Generator

First Component

| | |
|---|---|
| 350 lb. | water |
| 100 lb. | calcium-chloride (83-87%) |
| 2.5 lb. | silica fume (.4 micron) |
| 90 lb. | expanding agent |

Third Component

| | |
|---|---|
| 150 lb. | water |
| 4 lb. | wallastonite (8 micron) |
| 55 lb. | magnesium-oxide (5 micron) |
| 25 lb. | zeolite (4.5 micron) |
| 25 lb. | talc (9 micron) |

Example 9

120 Meshes Per Inch, Third Stage Y Bubble Reforming Generator

First Component

| | |
|---|---|
| 350 lb. | water |
| 100 lb. | calcium-chloride (83-87%) |
| 2.5 lb. | silica fume (.4 micron) |
| 90 lb. | expanding agent |

Third Component

| | |
|---|---|
| 150 lb. | water |
| 4 lb. | calcium-carbonate (.7 micron) |
| 2.5 lb. | silica fume (.4 micron) |
| 55 lb. | magnesium-oxide (5 micron) |
| 50 lb. | talc (9 micron) |

Example 10

120 Meshes Per Inch, Third Stage Y Bubble Reforming Generator

First Component

| | |
|---|---|
| 350 lb. | water |
| 100 lb. | calcium-chloride (83-87%) |
| 6 lb. | silica fume (.4 micron) |
| 90 lb. | expanding agent |

Third Component

| | |
|---|---|
| 155 lb. | water |
| 4 lb. | wollastonite (8 micron) |
| 1 lb. | perlite (20 micron) |
| 1 lb. | silica fume (.4 micron) |
| .5 lb. | perlite (less than 10% retained on 325 mesh screen) |
| .5 lb. | gypsum cement (5 micron) |
| 55 lb. | magnesium-oxide (5 micron) |
| 50 lb. | talc (9 micron) |

Example 11

200 Meshes Per Inch, Third Stage Y Bubble Reforming Generator

| | |
|---|---|
| 350 lb. | water |
| 100 lb. | calcium-chloride (83-87%) |
| 4 lb. | silica fume (.4 micron) |
| 90 lb. | expanding agent |

Third Component

| | |
|---|---|
| 150 lb. | water |
| 15 lb. | perlite (20 micron) |
| 1 lb. | silica fume (.4 micron) |
| 1 lb. | perlite (less than 10% retained on 325 mesh screen) |
| 1 lb. | gypsum cement (5 micron) |
| 55 lb. | magnesium-oxide (5 micron) |
| 35 lb. | talc (9 micron) |

Example 12

40 Meshes Per Inch, Second Stage Bubble Reformer

150 Meshes Per Inch, Third Stage Y Bubble Reforming Generator

First Component

| | |
|---|---|
| 350 lb. | water |
| 100 lb. | calcium-chloride (77-80%) |
| 4 lb. | silica fume (.4 micron) |
| 1 lb. | kaolin (.2 micron) |
| 90 lb. | expanding agent |

Third Component

| | |
|---|---|
| 170 lb. | water |
| 4 lb. | wallastonite (8 micron) |
| 5 lb. | zeolite (4.5 micron) |
| 4 lb. | metakaolin (2.1 micron) |
| 3 lb. | pumice (3 micron) |
| 1 lb. | calcium-hydroxide (4 micron) |
| 55 lb. | magnesium-oxide (5 micron) |
| 50 lb. | talc (9 micron) |

Example 13

40 Meshes Per Inch, Second Stage Bubble Reformer

200 Meshes Per Inch, Third Stage Y Bubble Reforming Generator

First Component

| | |
|---|---|
| 350 lb. | water |
| 100 lb. | calcium-chloride (77-80%) |
| 5 lb. | silica fume (.4 micron) |
| 90 lb. | expanding agent |

Third Component

| | |
|---|---|
| 175 lb. | water |
| 6 lb. | wollastonite (8 micron) |
| 5 lb. | zeolite (4.5 micron) |
| 4 lb. | metakaolin (2.1 micron) |
| 10 lb. | pumice (3 micron) |
| 5 lb. | kaolin (.2 micron) |
| 2 lb. | calcium-hydroxide (4 micron) |
| 20 lb. | gypsum (2 micron) |
| 55 lb. | magnesium-oxide (5 micron) |
| 10 lb. | talc (9 micron) |

Example 14

40 Meshes Per Inch, Second Stage Bubble Reformer

150 Meshes Per Inch, Third Stage Y Bubble Reforming Generator

First Component

| | |
|---|---|
| 350 lb. | water |
| 100 lb. | calcium-chloride (77-80%) |
| 5 lb. | silica fume (.4 micron) |
| .5 lb. | kaolin (.2 micron) |
| 90 lb. | expanding agent |

Third Component

| | |
|---|---|
| 175 lb. | water |
| 6 lb. | wallastonite (8 micron) |
| 5 lb. | zeolite (4.5 micron) |
| 4 lb. | metakaolin (2.1 micron) |
| 20 lb. | pumice (3 micron) |
| 20 lb. | gypsum (2 micron) |
| 1 lb. | calcium-hydroxide (4 micron) |
| 55 lb. | magnesium-oxide (5 micron) |
| 10 lb. | talc (9 micron) |

Example 15

60 Meshes Per Inch, Second Stage Bubble Reformer

200 Meshes Per Inch, Third Stage Y Bubble Reforming Generator

First Component

| | |
|---|---|
| 350 lb. | water |
| 75 lb. | calcium-chloride (83-87%) |
| 3 lb. | silica fume (.4 micron) |
| .5 lb. | kaolin (.2 micron) |
| 90 lb. | expanding agent |

Third Component

| | |
|---|---|
| 175 lb. | water |
| 6 lb. | wallastonite (8 micron) |
| 5 lb. | zeolite (4.5 micron) |
| 4 lb. | metakaolin (2.1 micron) |
| 15 lb. | pumice (3 micron) |
| .5 lb. | calcium-hydroxide (4 micron) |
| 20 lb. | gypsum (2 micron) |
| 5 lb. | gypsum stabilizing agent (hydrated lime, aluminum sulfate, gypsum) |
| 55 lb. | magnesium-oxide (5 micron) |
| 10 lb. | talc (9 micron) |

Example 16

60 Meshes Per Inch, Second Stage Bubble Reformer

150 Meshes Per Inch, Third Stage Y Bubble Reforming Generator

First Component

| | |
|---|---|
| 350 lb. | water |
| 100 lb. | magnesium-chloride (47%) |
| 3 lb. | silica fume (.4 micron) |
| .5 lb. | kaolin (.2 micron) |
| 90 lb. | expanding agent |

Third Component

| | |
|---|---|
| 175 lb. | water |
| 6 lb. | wallastonite (8 micron) |
| 3 lb. | kaolin (.2 micron) |
| 10 lb. | pumice (3 micron) |
| 20 lb. | zeolite (4.5 micron) |
| 4 lb. | calcium-hydroxide (4 micron) |
| 20 lb. | gypsum (7 micron) |
| 5 lb. | gypsum stabilizing agent (hydrated lime, aluminum sulfate, gypsum) |
| 55 lb. | magnesium-oxide (5 micron) |

Example 17

60 Meshes Per Inch, Second Stage Bubble Reformer

150 Meshes Per Inch, Third Stage Y Bubble Reforming Generator

First Component

| | |
|---|---|
| 350 lb. | water |
| 50 lb. | magnesium- chloride (47%) |
| 50 lb. | calcium-chloride (83-87%) |
| 4 lb. | silica fume (.4 micron) |
| 1 lb. | kaolin (.2 micron) |
| 90 lb. | expanding agent |

Third Component

| | |
|---|---|
| 175 lb. | water |
| 3 lb. | wollastonite (2.8 micron) |
| 3 lb. | wollastonite (8 micron) |
| 5 lb. | gypsum (2 micron) |
| 10 lb. | gypsum (7 micron) |
| 5 lb. | gypsum (12 micron) |
| 10 lb. | zeolite (4.5 micron) |
| 1 lb. | calcium-hydroxide (4 micron) |

-continued

| | |
|---|---|
| 4 lb. | kaolin (.2 micron) |
| 55 lb. | magnesium-oxide (5 micron) |
| 25 lb. | talc (9 micron) |

Example 18

60 Meshes Per Inch, Second Stage Bubble Reformer

120 Meshes Per Inch, Third Stage Y Bubble Reforming Generator

First Component

| | |
|---|---|
| 350 lb. | water |
| 125 lb. | magnesium-chloride (47%) |
| 4 lb. | silica fume (.4 micron) |
| 90 lb. | expanding agent |

Third Component

| | |
|---|---|
| 150 lb. | water |
| 20 lb. | pumice (3 micron) |
| 15 lb. | zeolite (4.5 micron) |
| 10 lb. | gypsum (7 micron) |
| 1.5 lb. | calcium-hydroxide (4 micron) |
| 2 lb. | kaolin (.2 micron) |
| 55 lb. | magnesium-oxide (5 micron) |

Example 19

40 Meshes Per Inch, Second Stage Bubble Reformer

120 Meshes Per Inch, Third Stage Y Bubble Reforming Generator

First Component

| | |
|---|---|
| 350 lb. | water |
| 100 lb. | calcium-chloride (83-87%) |
| 4 lb. | silica fume (.4 micron) |
| 90 lb. | expanding agent |

Third Component

| | |
|---|---|
| 150 lb. | water |
| 4 lb. | wallastonite (8 micron) |
| 5 lb. | gypsum (7 micron) |
| 4 lb. | pumice (3 micron) |
| 10 lb. | zeolite (4.5 micron) |
| 2 lb. | metakaolin (2.1 micron) |
| 1 lb. | silica fume (.4 micron) |
| 3 lb. | kaolin (.2 micron) |
| .5 lb. | calcium-hydroxide (4 micron) |
| 55 lb. | magnesium-oxide (5 micron) |
| 15 lb. | talc (9 micron) |

Example 20

40 Meshes Per Inch, Second Stage Bubble Reformer

120 Meshes Per Inch, Third Stage Y Bubble Reforming Generator

First Component

| | |
|---|---|
| 350 lb. | water |
| 100 lb. | calcium-chloride (83-87%) |
| 3 lb. | silica fume (.4 micron) |
| 85 lb. | expanding agent |

Third Component

| | |
|---|---|
| 150 lb. | water |
| 5 lb. | potassium-silicate (99%, 2.17 weight ratio) |
| 10 lb. | wollastonite (8 micron) |
| 15 lb. | gypsum (7 micron) |
| 5 lb. | gypsum stabilizing agent (hydrated lime, Aluminum sulfate, gypsum) |
| 10 lb. | zeolite (4.5 micron) |
| 5 lb. | metakaolin (2.1 micron) |
| 55 lb. | magnesium-oxide (5 micron) |

Example 21

40 Meshes Per Inch, Second Stage Bubble Reformer

120 Meshes Per Inch, Third Stage Y Bubble Reforming Generator

First Component

| | |
|---|---|
| 350 lb. | water |
| 100 lb. | calcium-chloride (83-87%) |
| 3 lb. | silica fume (.4 micron) |
| .5 lb. | kaolin (.2 micron) |
| 85 lb. | expanding agent |

Third Component

| | |
|---|---|
| 150 lb. | water |
| 3 lb. | potassium-silicate (99%, 2.17 weight ratio) |
| 3 lb. | sodium-silicate (82.5%, 2.4 weight ratio) |
| 10 lb. | wollastonite (8 micron) |
| 5 lb. | gypsum (2 micron) |
| 10 lb. | gypsum (4.3 micron) |
| 1 lb. | calcium-hydroxide |
| 10 lb. | zeolite (4.5 micron) |
| 5 lb. | metakaolin (2.1 micron) |
| 55 lb. | magnesium-oxide (5 micron) |

Example 22

60 Meshes Per Inch, Second Stage Bubble Reformer

120 Meshes Per Inch, Third Stage Y Bubble Reforming Generator

First Component

| | |
|---|---|
| 350 lb. | water |
| 100 lb. | calcium-chloride (83-87%) |
| 3 lb. | silica fume (.4 micron) |
| 2 lb. | sodium acid pyrophosphate (10% solution) |
| 90 lb. | expanding agent |

Third Component

| | |
|---|---|
| 150 lb. | water |
| 6 lb. | potassium-silicate (99%, 2.17 weight ratio) |
| 10 lb. | wollastonite (8 micron) |
| 4 lb. | wollastonite (2.8 micron) |
| 10 lb. | zeolite (4.5 micron) |
| 5 lb. | metakaolin (2.1 micron) |
| 5 lb. | gypsum (4.3 micron) |
| 3 lb. | pumice (3 micron) |
| 3 lb. | calcium-hydroxide (4 micron) |
| 55 lb. | magnesium-oxide (5 micron) |
| 5 lb. | talc (5 micron) |

Example 23

60 Meshes Per Inch, Second Stage Bubble Reformer

120 Meshes Per Inch, Third Stage Y Bubble Reforming Generator

First Component

| | |
|---|---|
| 350 lb. | water |
| 100 lb. | calcium-chloride (83-87%) |
| 2 lb. | gypsum cement (5 micron) |
| 90 lb. | expanding agent |

Third Component

| | |
|---|---|
| 150 lb. | water |
| 2 lb. | wollastonite (8 micron) |
| 2 lb. | metakaolin (2.1 micron) |
| 2 lb. | calcium-hydroxide (4 micron) |
| 1 lb. | silica fume (.4 micron) |
| 55 lb. | magnesium-oxide (5 micron) |
| 50 lb. | talc (5 micron) |

Example 24

40 Meshes Per Inch, Second Stage Bubble Reformer

120 Meshes Per Inch, Third Stage Y Bubble Reforming Generator

First Component

| | |
|---|---|
| 350 lb. | water |
| 100 lb. | calcium-chloride (77-80%) |
| 3 lb. | silica fume (.4 micron) |
| 4 lb. | kaolin (.2 micron) |
| 90 lb. | expanding agent |

Third Component

| | |
|---|---|
| 150 lb. | water |
| 4 lb. | wallastonite (8 micron) |
| 3 lb. | zeolite (4.5 micron) |
| 5 lb. | gypsum (4.3 micron) |
| 1 lb. | silica fume (.4 micron) |
| 6 lb. | calcium aluminate cement (AL2 O3 78%) |
| 55 lb. | magnesium-oxide (5 micron) |
| 50 lb. | talc (5 micron) |

Although the present invention has been described in connection with a preferred embodiment, it should be understood that modifications, alterations, and additions can be made to the invention without departing from the scope of the invention as defined by the claims.

What is claimed is:

1. A system for manufacturing and distributing a cementitious foam, comprising:
   a. a source of bubble fluid;
   b. a source of compressed air;
   c. a source of cement; and
   d. a foam generation and distribution gun, comprising:
      i. an upstream end and a downstream end;
      ii. a first elongated chamber of a first diameter and in which a plurality of bubble forming media are contained and that extends between a first end portion positioned adjacent to said upstream end, and an opposite second end portion;
      iii. first and second conduits for carrying said bubble fluid from said source of bubble fluid and said compressed air, respectively, to said first end portion, wherein a mixture of bubble fluid and compressed air is generated and forcibly passed through said first elongated chamber at a first pressure, whereby upon exiting said first chamber a foam fluid is formed from said compressed air and bubble fluid;
      iv. a second chamber extending from said first elongated chamber and in which a first foam fluid reforming structure is contained, whereby said foam fluid is reformed as it exits said second chamber;
      v. a third chamber extending outwardly from said second elongated chamber and in which a second foam fluid reforming structure is contained and through which said foam fluid passes, wherein said foam fluid is at a second pressure lower than said first pressure upon entering said third chamber and at a third pressure equal to said second pressure upon exiting said third chamber;

vi. a foam distribution conduit positioned downstream from said third chamber; and vii. a third conduit for carrying said cement to said foam distribution conduit, wherein said cement is combined with said foam fluid prior to passing through said foam distribution conduit, wherein said cement and foam fluid combination are mixed together at a fourth pressure lower than said second and third pressures.

2. The system according to claim 1, wherein said bubble forming media comprises beads.

3. The system according to claim 2, wherein said beads are composed of glass.

4. The system according to claim 2 wherein each of said beads are of uniform size.

5. The system according to claim 1, further comprising first and second mesh screens positioned in spaced parallel relation to one another and within said first end portion.

6. The system according to claim 5, wherein said first mesh screen is of a first predetermined size and said second mesh screen is positioned downstream from said first mesh screen and is of a second predetermined size.

7. The system according to claim 6, wherein said first mesh screen is 30 mesh in size and said second mesh screen is positioned downstream from a third mesh screen and is 20 mesh in size.

8. The system according to claim 7, wherein said third mesh screen is of a third predetermined size and a fourth mesh screen is positioned downstream from said third mesh screen and is of a fourth predetermined size.

9. The system according to claim 8, wherein said third mesh screen is 20 mesh in size and said fourth mesh screen is positioned downstream from said third mesh screen and is 30 mesh in size.

10. The system according to claim 1, wherein said first foam fluid reforming structure comprises first and second mesh screens positioned in spaced parallel relation to one another.

11. The system according to claim 1, wherein said second foam reforming structure comprises a screened cartridge.

12. The system according to claim 11, wherein said screened cartridge is between 100 and 400 meshes per linear inch.

13. The system according to claim 1, wherein said first pressure is between 40 and 60 psi and said second and third pressures are between 20 and 40 psi.

14. A foam generation and distribution gun for use with a source of compressed air and a source of cement, comprising:

a. an upstream end and a downstream end;

b. a first elongated chamber of a first diameter and in which a plurality of bubble forming media are contained and that extends between a first end portion positioned adjacent to said upstream end, and an opposite second end portion;

c. first and second conduits for carrying said bubble forming media and the compressed air, respectively, to said first end portion, wherein a mixture of bubble fluid and compressed air is generated and forcibly passed through said first elongated chamber at a first pressure, whereby upon exiting said first chamber a foam fluid is formed from said compressed air and bubble fluid;

d. a second chamber extending from said first elongated chamber and in which a first foam fluid reforming structure is contained, whereby said foam fluid is reformed as it exits said second chamber;

e. a third chamber extending outwardly from said second elongated chamber and in which a second foam fluid reforming structure is contained and through which said foam fluid passes, wherein said foam fluid is at a second pressure lower than said first pressure upon entering said third chamber and at a third pressure equal to said second pressure upon exiting said third chamber;

f. a foam distribution conduit positioned downstream from said third chamber; and g. a third conduit for carrying the cement to said foam distribution conduit, wherein the cement is combined with said foam fluid prior to passing through said foam distribution conduit, wherein the cement and foam fluid combination are mixed together at a fourth pressure lower than said second and third pressures.

15. The foam generation and distribution gun according to claim 14, wherein said bubble forming media comprises beads.

16. The foam generation and distribution gun according to claim 15, wherein said beads are composed of glass.

17. The foam generation and distribution gun according to claim 15 wherein each of said beads are of uniform size.

18. The foam generation and distribution gun according to claim 14, further comprising first and second mesh screens positioned in spaced parallel relation to one another and within said first end portion.

19. The foam generation and distribution gun according to claim 18, wherein said first mesh screen is of a first predetermined size and said second mesh screen is positioned downstream from said first mesh screen and is of a second predetermined size.

20. The foam generation and distribution gun according to claim 19, wherein said first mesh screen is 30 mesh in size and said second mesh screen is positioned downstream from a third mesh screen and is 20 mesh in size.

21. The foam generation and distribution gun according to claim 20, wherein said third mesh screen is of a third predetermined size, and a fourth mesh screen is positioned downstream from said third mesh screen and is of a fourth predetermined size.

22. The foam generation and distribution gun according to claim 21, wherein said third mesh screen is 20 mesh in size and said fourth mesh screen is positioned downstream from said third mesh screen and is 30 mesh in size.

23. The foam generation and distribution gun according to claim 14, wherein said first foam fluid reforming structure comprises first and second mesh screens positioned in spaced parallel relation to one another.

24. The foam generation and distribution gun according to claim 14, wherein said second foam reforming structure comprises a screened cartridge.

25. The foam generation and distribution gun according to claim 24, wherein said screened cartridge is between 100 and 400 meshes per linear inch.

26. The foam generation and distribution gun according to claim 14, wherein said first pressure is between 40 and 60 psi and said second and third pressures are between 20 and 40 psi.

* * * * *